United States Patent
Wang

(10) Patent No.: US 12,105,655 B2
(45) Date of Patent: Oct. 1, 2024

(54) SYSTEM AND METHOD FOR OPTIMIZING AHB BUS DATA TRANSMISSION PERFORMANCE AND SERVER

(71) Applicant: Suzhou MetaBrain Intelligent Technology Co., Ltd., Suzhou (CN)

(72) Inventor: Zenghe Wang, Suzhou (CN)

(73) Assignee: Suzhou MetaBrain Intelligent Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/567,586

(22) PCT Filed: May 26, 2022

(86) PCT No.: PCT/CN2022/095381
§ 371 (c)(1),
(2) Date: Dec. 6, 2023

(87) PCT Pub. No.: WO2023/103297
PCT Pub. Date: Jun. 15, 2023

(65) Prior Publication Data
US 2024/0264961 A1 Aug. 8, 2024

(30) Foreign Application Priority Data
Dec. 10, 2021 (CN) .......................... 202111502587.2

(51) Int. Cl.
*G06F 13/362* (2006.01)
(52) U.S. Cl.
CPC .................. *G06F 13/362* (2013.01)
(58) Field of Classification Search
CPC .................................................... G06F 13/362
(Continued)

(56) References Cited

U.S. PATENT DOCUMENTS

| 6,748,497 B1* | 6/2004 | Kang | G06F 13/1673 711/146 |
| 6,996,655 B1* | 2/2006 | Lee | G06F 13/28 710/308 |
| 2004/0236887 A1* | 11/2004 | Kim | G06F 13/00 710/110 |

(Continued)

FOREIGN PATENT DOCUMENTS

| CN | 1690996 A | 11/2005 |
| CN | 101533381 A | 9/2009 |

(Continued)

OTHER PUBLICATIONS

AMBA AHB protocol Spec (Year: 2021).*

(Continued)

*Primary Examiner* — Paul R. Myers
(74) *Attorney, Agent, or Firm* — DINSMORE & SHOHL LLP

(57) ABSTRACT

A system for optimizing AHB bus data transmission performance includes a master; a decoder connected to the master; a first multiplexer connected to the decoder; and a plurality of slaves connected to the first multiplexer, the decoder, and the master, where the decoder is configured to output a slave selection signal, and determine a slave in transmission communication with the master based on the slave selection signal. The first multiplexer is configured to receive a transmission complete signal output by each slave, and select a transmission complete signal of a corresponding slave based on a first selection signal and output it to the corresponding slave, where the first selection signal is formed by beating the slave selection signal.

20 Claims, 4 Drawing Sheets

(58) Field of Classification Search
USPC .......................................................... 710/110
See application file for complete search history.

(56) References Cited

U.S. PATENT DOCUMENTS

| | | | |
|---|---|---|---|
| 2005/0138253 A1* | 6/2005 | Chae | G06F 13/405 |
| | | | 710/110 |
| 2005/0177664 A1* | 8/2005 | Cho | H04L 12/403 |
| | | | 710/110 |
| 2007/0005857 A1 | 1/2007 | Kang et al. | |
| 2007/0101043 A1* | 5/2007 | Herman | G06F 13/4004 |
| | | | 710/315 |
| 2008/0244131 A1 | 10/2008 | Vergnes | |
| 2009/0307401 A1* | 12/2009 | Feng | G06F 13/4031 |
| | | | 710/110 |
| 2013/0007320 A1* | 1/2013 | Langadi | G06F 13/4221 |
| | | | 710/110 |

FOREIGN PATENT DOCUMENTS

| | | |
|---|---|---|
| CN | 101777035 A | 7/2010 |
| CN | 104850524 A | 8/2015 |
| CN | 106021152 A | 10/2016 |
| CN | 205788168 U | 12/2016 |
| CN | 110765052 A | 2/2020 |
| CN | 113505016 A | 10/2021 |
| CN | 113918497 A | 1/2022 |

OTHER PUBLICATIONS

International Search Report dated Aug. 26, 2022, Application No. PCT/CN2022/095381.
Written opinion dated Aug. 26, 2022; Application No. PCT/CN2022/095381.
First Office Action of corresponding Chinese application 2021115025872.

* cited by examiner

SYSTEM AND METHOD FOR OPTIMIZING AHB BUS DATA TRANSMISSION PERFORMANCE AND SERVER

CROSS REFERENCE TO RELATED APPLICATIONS

The present application is the U.S. National stage of PCT/CN2022/095381 filed on May 26, 2022, which claims the priority of Chinese patent application filed with the Chinese Patent Office on Dec. 10, 2021 with an application number of 202111502587.2 and entitled "System and Method for Optimizing AHB Bus Data Transmission Performance and Server", and the patent application is incorporated herein by reference in its entirety.

TECHNICAL FIELD

The present application relates to a system and method for optimizing AHB bus data transmission performance and a server.

BACKGROUND

Through an AHB bus (Advanced High-performance Bus), a CPU (Central Processing Unit), a high-bandwidth on-chip RAM (Random Access Memory), a high-bandwidth external memory interface, a DMA (Direct Memory Access) bus master and various controllers having AHB interfaces can be connected to constitute an independent and complete SOC (System on Chip) system. In addition, an APB (Advanced Peripheral Bus) system can also be connected through an AHB-APB bridge. The structure of a system constituted by AHB is as shown in FIG. 1. The AHB bus is mounted with a high-bandwidth memory interface, a high-performance ARM processor, a high-bandwidth RAM chip and a DMA bus master, the APB bus is mounted with a UART (Universal Asynchronous Receiver Transmitter), a keypad, a timer, a computer PIO (Parts In One) and other external devices, and the AHB bus and the APB bus are connected through an AHB to APB bridge.

A complete AHB is composed of four parts:
- an AHB master: initiating one reading/writing operation, and allowing only one master to use a bus at one moment;
- an AHB slave: responding to one reading/writing operation, and selecting to use which slave through address mapping;
- an AHB arbiter: allowing a certain master to control the bus; and
- an AHB decoder: determining to select which slave through address decoding.

The bus can be divided into three groups: a write data bus (HWDATA), a read data bus (HRDATA) and an address control bus (HADDR).

The communication principles of AHB are as follows: the master that needs to occupy bus sends a request to the arbiter, and the arbiter authorizes a designated master. Only one master can access to the bus in any time cycle, and performs reading and writing operations on the designated slave.

The master which is authorized by the bus begins AHB transmission, and firstly sends an address signal and a control signal, to provide the address information, transmission direction, bandwidth and the type of burst. The decoder determines which slave is in communication with the master according to the address signal and the control signal. Data transmission is finished through a data bus, the AHB separates the reading bus and the writing bus, the writing data bus is used for data transmission from master to slave, and the reading data bus is used for data transmission from slave to master. Each transmission includes an address and control cycle and one or more data cycles. The address and control cycle cannot be expanded, therefore the slave must sample the address signal within a cycle, while the data cycle can be expanded through an Hready signal, when the Hready is low, it indicates that the slave is not ready to receive data, and needs additional time to sample data. Data transmission of AHB is as shown in FIG. 2. Wherein HCLK refers to a clock signal provided to a high-speed bus AHB, Control refers to a control signal, and Data refers to data.

On a first rising edge, the master initiates an operation A, and drives the address signal and the control signal;
  on a second rising edge, the slave samples the address signal and the control signal sent by the master;
  if it is a writing operation, the master will transmit data to be written on the second rising edge;
  if it is a reading operation, the slave will sample data after the Hready signal is pulled high, however, if the slave is not ready to sample this data, the slave will pull low its own Hready signal, to prolong sampling time, therefore, the slave does not receive this data on the second rising edge; meanwhile, on this rising edge, the master samples that the Hready is low, and knows that the slave does not receive data sent by itself, so the master will maintain the sent address and data information;
  it is similar to the third rising edge;
  on a fourth rising edge, the slave will pull high the Hready signal, it indicates that the slave has already sampled data sent by the master, so the Hready signal is pulled high, and the slave attempts to inform the master that it has received data;
  similarly, herein the master samples that Hready sent by the slave is high, and knows that the slave has successfully received data, therefore, other data will be sent in the next cycle.

The flow of data transmission is just as described above. The slave informs the master whether it has received data through sending the Hready signal, to further influence subsequent operations of the master.

The AHB supports a pipeline operation (multiple events can be processed at one time), for example, if no pipeline operation is adopted, one event can be finished at least in two cycles, that is, an address is sent in a first cycle, data is sent in a second cycle, the next address is sent in a third cycle, and corresponding data is sent in a fourth cycle, in this way, four cycles are required if two types of information (that is, address and data) are sent; if a pipeline operation is adopted, a first address is sent in the first cycle, a first data is sent in the second cycle, and a second address is sent simultaneously in the second cycle, a second data is sent in the third cycle, and a third address is sent simultaneously in the third cycle, in this way, three cycles are required when the two types of information are sent, and the pipeline operation has an advantage that it is more time-consuming when more information is sent. Data transmission of an AHB pipeline operation is specifically as shown in FIG. 3.

During a pipeline operation, a data phase of this operation is an address phase of the next operation, when the master is connected to another slave from being connected to one slave, the next slave must first judge whether the operation of the master on the other slave has been completed. If so, then respond to the operation of the master; otherwise, wait for completion and then respond to the operation.

In the AHB, the slave actually has two Hready signals, which are respectively Hready_in of an input type and Hready_out of an output type, wherein Hready_out refers to the Hready mentioned above, and Hready_in refers to a signal used by the slave to judge whether the operation of the master on the other slave has been completed.

When a plurality of slaves are available, the Hready_out of each slave are connected together and sent to the master, as to the origin of the Hready_in signal of the slave in the prior art, the Hready_out signal of each slave is added together and respectively connected to each slave to serve as the Hready_in signal, specifically as shown in FIG. 4 which is a schematic diagram of a connecting structure for generating the Hready_in signal of the slave. That is, the Hready_in signal is obtained by adding each Hready_out, and each slave must sample the address signal and the control signal when the Hready_in signal is a high-level signal.

The inventor realized that, the Hready_in signal in the prior art is obtained by adding each Hready_out, and will be influenced by Hready_out of other slaves, thereby increasing probability of errors of Hready_in.

SUMMARY OF THE INVENTION

According to various embodiments disclosed in the present application, one aspect of the embodiments of the present application provides a system for optimizing AHB bus data transmission performance, and the system includes:
a master;
a decoder connected to the master;
a first multiplexer connected to the decoder; and
a plurality of slaves connected to the first multiplexer, the decoder and the master;
wherein the decoder is configured to output a slave selection signal, and determine a slave in transmission communication with the master based on the slave selection signal; and
the first multiplexer is configured to receive a transmission complete signal output by each slave, and select a transmission complete signal of a corresponding slave based on a first selection signal and output it to the corresponding slave, wherein the first selection signal is formed by beating the slave selection signal.

In one or more embodiments, the system further includes:
a second multiplexer connected to the decoder; and
a register connected to the second multiplexer and the first multiplexer;
wherein the second multiplexer is configured to select a corresponding slave selection signal based on a second selection signal, beat the corresponding slave selection signal through the register and send the corresponding slave selection signal after beat to the first multiplexer through the register.

In one or more embodiments, the decoder is configured to acquire number of cycles of delay of the transmission complete signal output by the slave, and determine number of beats of the slave selection signal based on the number of cycles of delay of the transmission complete signal.

In one or more embodiments, the register is configured to acquire the number of beats of the slave selection signal to beat the slave selection signal, and send the slave selection signal after beat to the first multiplexer.

In one or more embodiments, the decoder is configured to determine that the number of beats of the slave selection signal is 1 in response to the transmission complete signal is not delayed.

In one or more embodiments, the decoder is configured to determine that the number of beats of the slave selection signal is a sum of the number of cycles of delay and 1 in response to the transmission complete signal is delayed.

In one or more embodiments, the first multiplexer is configured to take the transmission complete signal output by each slave as respective transmission complete input signal and output which to the slave; and
the slave is configured to determine whether an address signal and a control signal output by the master are adopted according to the transmission complete input signal.

In one or more embodiments, the slave is configured to receive the address signal and the control signal sent by the master in response to the transmission complete input signal is a high-level signal.

Another aspect of the embodiments of the present application further provides a method for optimizing AHB bus data transmission performance, wherein the following steps are performed based on the system mentioned in any of the above items:
outputting the slave selection signal based on the decoder to determine the slave in communication with the master; and
receiving the transmission complete signal output by each slave based on the first multiplexer, and selecting, by the first multiplexer, a transmission complete signal of a corresponding slave based on the first selection signal and outputting it to the corresponding slave, wherein the first selection signal is formed by beating the slave selection signal.

Another aspect of the embodiments of the present application further provides a server, including the system of any of the above items.

Details of one or more embodiments of the present application are proposed in the following accompanying drawings and description. Other features and advantages of the present application will become apparent from the specification, accompanying drawings and claims.

BRIEF DESCRIPTION OF THE DRAWINGS

To more clearly illustrate technical solutions in the embodiments of the present application or in the prior art, accompanying drawings which need to be used in the description of the embodiments or the prior art will be introduced briefly below. Apparently, the accompanying drawings in the following description are merely some embodiments of the present application, for those skilled in the art, other embodiments can also be obtained according to these drawings without any creative effort.

DETAILED DESCRIPTION

In order to make the object, technical solutions and advantages of the present application more clear, embodiments of the present application will be further described in details below in combination with specific embodiments and with reference to accompanying drawings.

It should be noted that, all expressions of "first" and "second" used in the embodiments of the present application are all used to distinguish between two different entities with the same name or two different parameters with the same name. It can be seen that the expressions like "first" and "second" are for convenience of expression only and should not be construed as limiting the embodiments of the present application. Subsequent embodiments will not be described in details.

Figure 1:
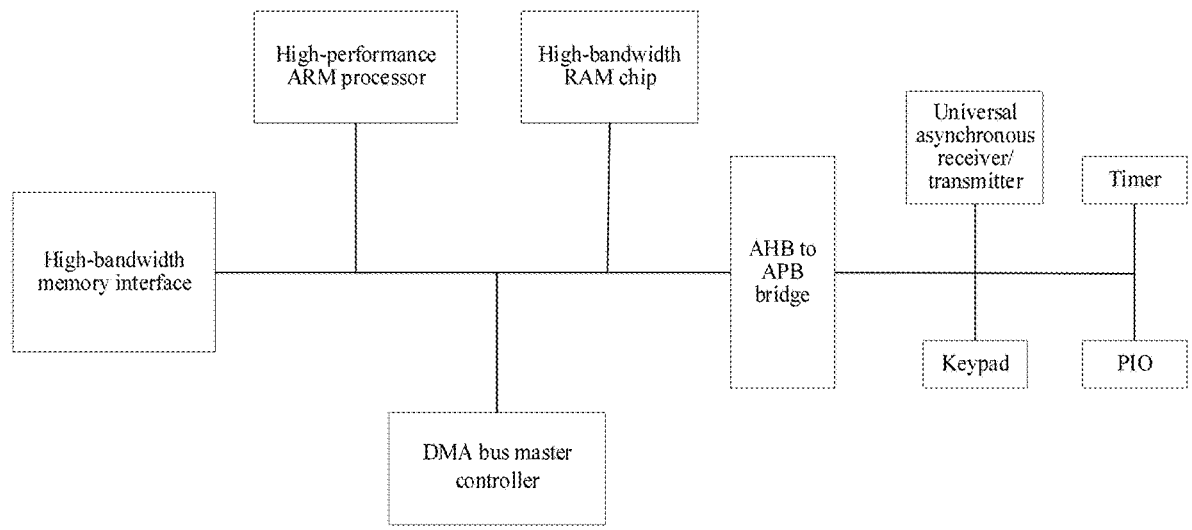
FIG. 1 is a structural schematic diagram of a data transmission system constituted by an AHB bus provided in the present application.
Figure 2:
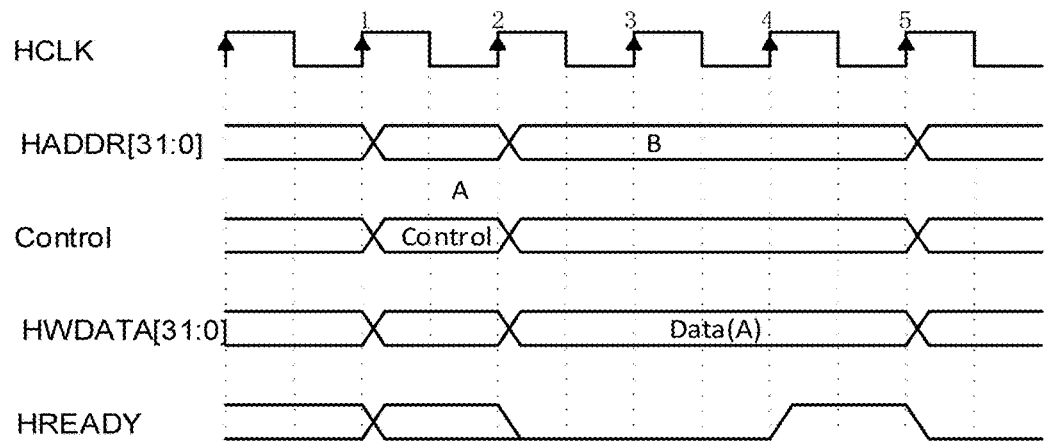
FIG. 2 is a schematic diagram of data transmission of an AHB bus provided in the present application.
Figure 3:
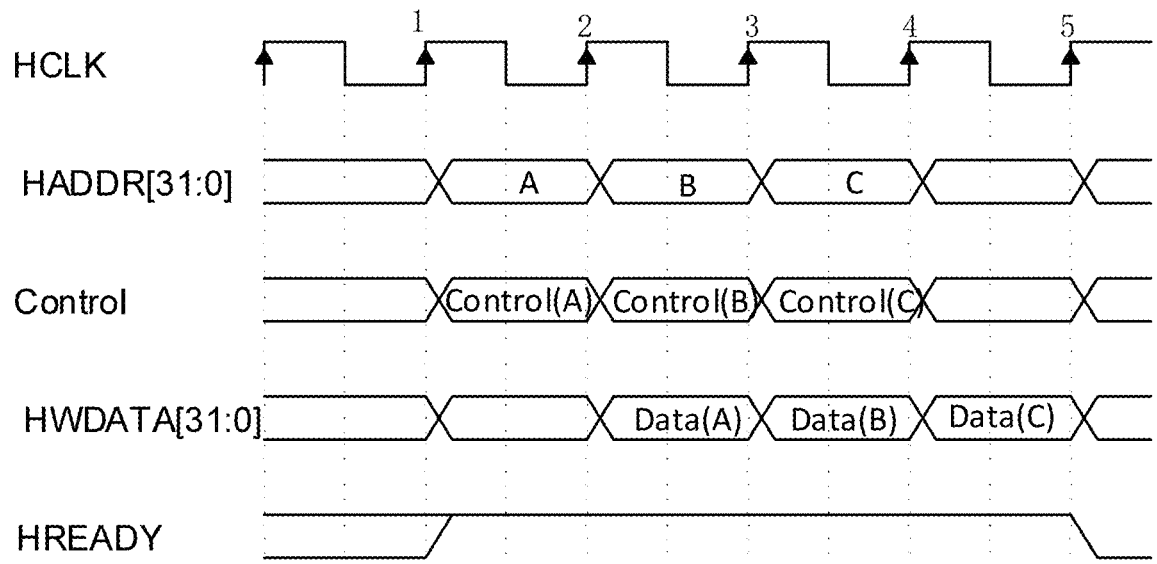
FIG. 3 is a schematic diagram of data transmission of a pipeline operation of an AHB bus provided in the present application.
Figure 4:
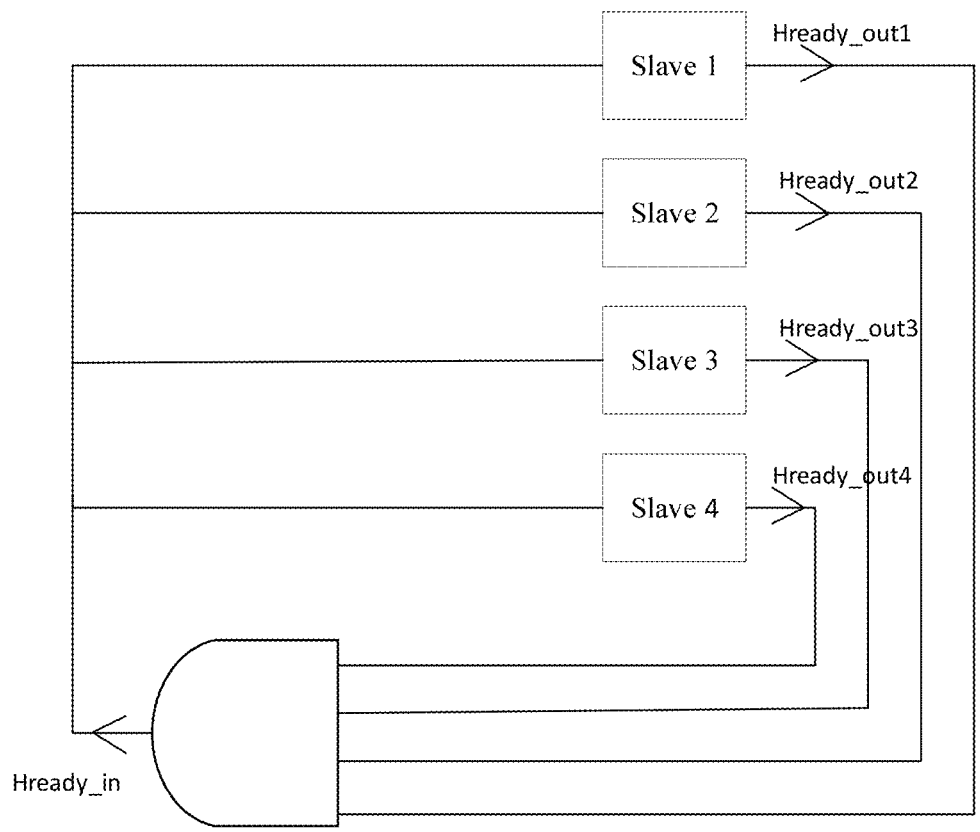
FIG. 4 is a schematic diagram of a connecting structure for generating the Hready_in signal of a slave provided in the present application.
Figure 5:
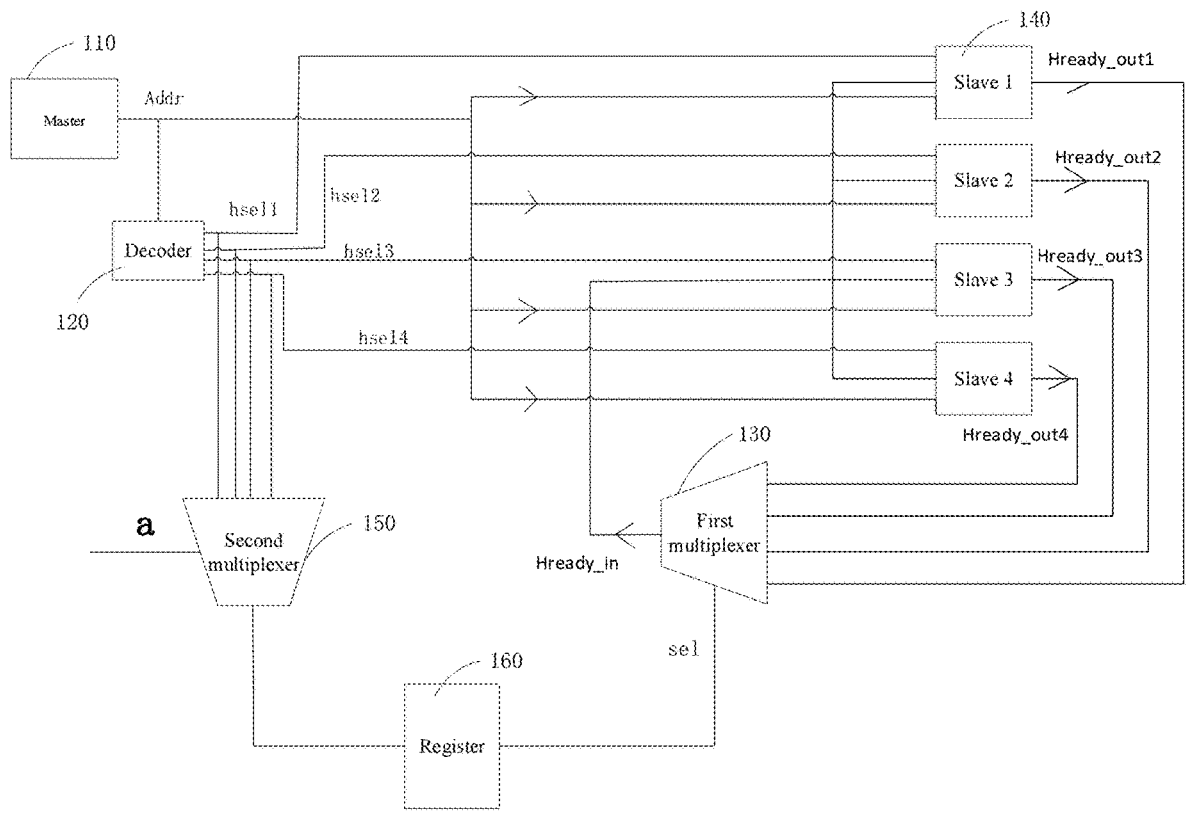
FIG. 5 is a structural schematic diagram of one or more embodiments of a system for optimizing AHB bus data transmission performance provided in the present application.

Based on the above object, a first aspect of the embodiments of the present application provides an embodiment of a system for optimizing AHB bus data transmission performance. As shown in FIG. 5, the system specifically includes:
 a master 110;
 a decoder 120 connected to the master 110;
 a first multiplexer 130 connected to the decoder 120; and
 four slaves 140 connected to the first multiplexer 130, the decoder 120 and the master 110, which are respectively slave 1 to slave 4;
 wherein the decoder 120 is configured to output a slave selection signal hsel, and determine the slave 140 in transmission communication with the master 110 based on the slave selection signal; and
 the first multiplexer 130 is configured to receive a transmission complete signal output by each slave 140, and select a transmission complete signal of a corresponding slave based on a first selection signal sel and output it to the corresponding slave, wherein the first selection signal sel is formed by beating the slave selection signal.

During a pipeline operation, a data phase of this operation is an address phase of the next operation, when the master is connected to another slave from being connected to one slave, the next slave must first judge whether the operation of the master on the other slave has been completed. If so, then respond to the operation of the master; otherwise, wait for completion and then respond to the operation.

In the present embodiment, the transmission complete signal (that is, the Hready_out signal) of each slave is connected to an input of each slave through a multiplexer, to serve as the transmission complete input signal (that is, the Hready_in signal) of each slave, wherein the selection signal (that is, the sel signal) of the multiplexer is changed from the hsel signal decoded by the decoder through the sent address, and is the sel signal which beats the hsel signal to serve as the multiplexer, then how many beats the Hready_out is delayed, how many beats the hsel signal makes. Moreover, it is preset that sampling of the address signal and the control signal is performed only when each slave waits until its own Hready_in is a high-level signal or a low-level signal.

In the present embodiment, the Hready_in signal of each slave is generated through a multiplexer, the Hready_out signal of each slave is associated with the Hready_in signal of each slave, and as to the timing of Hready_in signal gating, that is, the sel signal of the multiplexer is realized through beating the hsel signal, and the hsel signal is beat and serves as the sel signal of the multiplexer, such that the hsel signal is aligned with the Hready_out signal, thereby achieving synchronism of the hsel signal and the Hready_out signal, improving accuracy of the Hready_in signal, and establishing a safe and reliable information channel between the master and the slave.

In one or more embodiments, the system of FIG. 5 further includes:
 a second multiplexer 150 connected with the decoder; and
 a register 160 connected with the second multiplexer 150 and the first multiplexer 130;
 wherein the second multiplexer 150 is configured to select a corresponding slave selection signal based on the second selection signal a, and the register 160 beats the corresponding slave selection signal and sends to the first multiplexer 130.

In the present embodiment, the second multiplexer selects the slave selection signal output from the slave decoder through a second selection signal a, that is, determines the slave in communication with the master, the second multiplexer sends the selected slave selection signal to the register, the register beats the slave selection signal, and sends the slave selection signal to the first multiplexer after beating, and the first multiplexer produces the corresponding Hready_in signal based on the Hready_out signal of each slave after receiving the slave selection signal after beat. When the Hready_in signal of the slave is a high-level signal, the slave samples the address signal and the control signal.

In the present embodiment, the Hready_in signal of each slave is generated through a multiplexer, the Hready_out signal of each slave is associated with the Hready_in signal of each slave, and as to the timing of Hready_in signal gating, that is, the sel signal of the multiplexer is realized through beating the hsel signal, and the hsel signal is beat and serves as the sel signal of the multiplexer, such that the hsel signal is aligned with the Hready_out signal, thereby achieving synchronism of the hsel signal and the Hready_out signal, improving accuracy of the Hready_in signal, and establishing a safe and reliable information channel between the master and the slave.

In one or more embodiments, the decoder is configured to acquire number of cycles of delay of the transmission complete signal output by the slave, and determine number of beats of the slave selection signal based on the number of cycles of delay of the transmission complete signal.

In one or more embodiments, the register is configured to acquire the number of beats of the slave selection signal to beat the slave selection signal, and send the slave selection signal after beat to the first multiplexer.

In one or more embodiments, the decoder is configured to determine that the number of beats of the slave selection signal is 1 in response to the transmission complete signal is not delayed.

In one or more embodiments, the decoder is configured to determine that the number of beats of the slave selection signal is a sum of the number of cycles of delay and 1 in response to the transmission complete signal is delayed.

In one or more embodiments, the first multiplexer is configured to take the transmission complete signal output by each slave as respective transmission complete input signal and output which to the slave; and the slave is configured to determine whether an address signal and a control signal output by the master are adopted according to the transmission complete input signal.

In one or more embodiments, the slave is configured to receive the address signal and the control signal sent by the master in response to the transmission complete input signal is a high-level signal.

A plurality of implementations of the present application will be illustrated below through specific embodiments.

For example, at a rising edge of time t, the hsel signal is converted to s2 (s2 refers to slave 2) from s1 (s1 refers to slave 1), indicating that the master is in communication with slave 2 from being in communication with slave 1, so the address of s2 (that is, addr2) should be sent at time t, however, due to the pipeline operation, previous data is on the data channel on the rising edge at time t+1, that is, data1 sent during communication with s1, therefore, although on a rising edge at time t+1, the sel of the multiplexer still should select the Hready_out signal of s1. Plainly speaking, when hsel is s2, it indicates that the master will select to communicate with s2, however, data on the bus at this time is still data1 sent to s1, s1 is not received, and s1 is in communication with s2 after receiving data.

In the present embodiment, when the master is in communication with slave s1, when s1_hready_out is pulled high, it indicates completion of data transmission, when s1_hready_out is pulled low, it indicates that slave s1 needs to prolong the sampling time, since the data phase is always later than the address phase by one cycle, therefore, when the master is switched to be in communication with slave s2 from being in communication with slave s1, the number of beats of the hsel1 signal is the number of cycles of delay plus 1, specifically, even when data sampling of slave s1 is not delayed, the hsel1 signal will be beat once, to finish data sampling of slave s1, after slave s1 completes data sampling, s1_hready_out is pulled low, and s2_hready_out is pulled high, at this time, the beat hsel1 signal is just switched to the hsel2 signal, and the master begins direct data transmission with slave s2.

hsel is beat to serve as the sel signal of the multiplexer, to align the hsel signal with Hready_out, thereby realizing synchronism of the two and easily achieving required functions. That is, the beat hsel is just corresponding to the Hready_out signal of slave s1 when the device is slave s1, then the multiplexer directly selects to pass through Hready_out of slave s1, and slave s2 is in a similar way. That is, sel selecting which Hready_out to pass through directly depends on the beat hsel, when hsel is slave s1, then slave s1 is selected, when hsel is slave s2, then Hready_out of slave s2 is selected to pass through.

In the present embodiment, the Hready_in signal of each slave is generated through a multiplexer, the Hready_out signal of each slave is associated with the Hready_in signal of each slave, and as to the timing of Hready_in signal gating, that is, the sel signal of the multiplexer is realized through beating the hsel signal, and the hsel signal is beat and serves as the sel signal of the multiplexer, such that the hsel signal is aligned with the Hready_out signal, thereby achieving synchronism of the hsel signal and the Hready_out signal, improving accuracy of the Hready_in signal, and establishing a safe and reliable information channel between the master and the slave.

Figure 6:
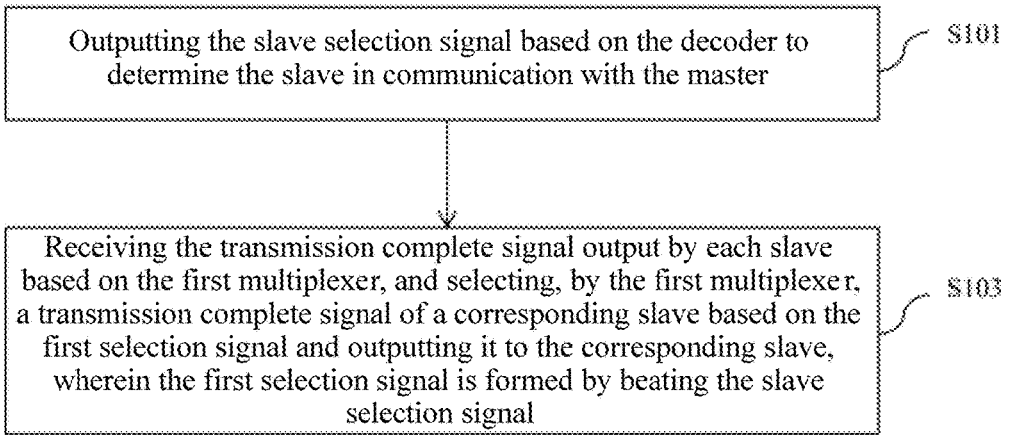
FIG. 6 is a block diagram of one or more embodiments of a method for optimizing AHB bus data transmission performance provided in the present application.

Based on the same inventive concept, according to another aspect of the present application, as shown in FIG. 6, the embodiments of the present application further provide a method for optimizing AHB bus data transmission performance, wherein the following steps are performed based on the system mentioned in any of the above items:

S101, outputting the slave selection signal based on the decoder to determine the slave in communication with the master; and S103, receiving the transmission complete signal output by each slave based on the first multiplexer, and selecting, by the first multiplexer, a transmission complete signal of a corresponding slave based on the first selection signal and outputting it to the corresponding slave, wherein the first selection signal is formed by beating the slave selection signal.

In the present embodiment, the Hready_in signal of each slave is generated through a multiplexer, the Hready_out signal of each slave is associated with the Hready_in signal of each slave, and as to the timing of Hready_in signal gating, that is, the sel signal of the multiplexer is realized through beating the hsel signal, and the hsel signal is beat and serves as the sel signal of the multiplexer, such that the hsel signal is aligned with the Hready_out signal, thereby achieving synchronism of the hsel signal and the Hready_out signal, improving accuracy of the Hready_in signal, and establishing a safe and reliable information channel between the master and the slave.

It should be understood that, although the steps in the flow chart of FIG. 6 are displayed in sequence according to indications of arrows, however, these steps are not necessarily performed in sequence according to an order indicated by arrows. Unless expressly stated herein, execution of these steps is not strictly limited, and these steps can also be performed in other orders. Moreover, at least a portion of steps in FIG. 6 may include a plurality of sub-steps or stages, these sub-steps or stages are not necessarily completed at the same time but may be performed at different time. The execution sequence of these sub-steps or stages is not necessarily sequential but may be performed alternately with other steps or at least a portion of the sub-steps or stages of other steps.

Figure 7:
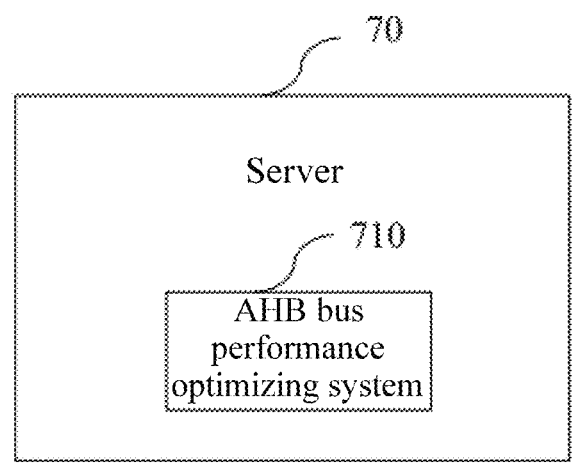
FIG. 7 is a schematic diagram of one or more embodiments of a server provided in the present application.

Based on the same inventive concept, according to another aspect of the present application, as shown in FIG. 7, embodiments of the present application provide a server 70, the server 70 includes an AHB bus performance optimizing system 710, and the AHB bus performance optimizing system 710 can be the system mentioned in the above embodiments of the present application.

In the present embodiment, the Hready_in signal of each slave is generated through a multiplexer, the Hready_out signal of each slave is associated with the Hready_in signal of each slave, and as to the timing of Hready_in signal gating, that is, the sel signal of the multiplexer is realized through beating the hsel signal, and the hsel signal is beat and serves as the sel signal of the multiplexer, such that the hsel signal is aligned with the Hready_out signal, thereby achieving synchronism of the hsel signal and the Hready_out signal, improving accuracy of the Hready_in signal, and establishing a safe and reliable information channel between the master and the slave.

Embodiments of the present application can further include a corresponding computer device. The computer device can include a memory and one or more processors, the memory has computer-readable instructions stored therein. When the computer-readable instructions are executed by a processor, steps of the method for optimizing the AHB bus data transmission performance provided in any embodiment of the present application are implemented.

Wherein as a non-volatile computer-readable storage medium, the memory can be used to store non-volatile software programs, non-volatile computer-executable programs and modules, such as program instructions or modules corresponding to the method for optimizing AHB bus data transmission performance in the embodiments of the present application. The processor executes various functional applications and data processing of the device by running the non-volatile software programs, instructions and modules stored in the memory, i.e., realizing the method for optimizing AHB bus data transmission performance of the above method embodiments.

The memory may include a stored program area and a stored data area, wherein the stored program area may store an operating system and applications required for at least one function; the storage data area may store data or the like created according to the use of the device. In addition, the memory may include a high-speed random access memory and may also include a non-volatile memory, such as at least one disk memory device, a flash memory device or other non-volatile solid-state memory devices. In some embodiments, the memory optionally includes memories remotely arranged relative to the processor, and these remote memories may be connected to a local module through a network. Examples of the above networks include, but are not limited to, Internet, intranet, local area network, mobile communication network and combinations thereof.

Finally, it should be noted that, those skilled in the art may understand that all or part of the flow in the method of the above embodiments can be implemented by means of a computer program instructing related hardware. The program can be stored in a computer-readable storage medium, and when the program is executed, the program can include the flow of the above method embodiments. Wherein, the storage medium of the program may be a magnetic disk, an optical disk, a read-only memory (ROM), a random access memory (RAM), or the like. Embodiments of the above computer program can achieve the same or similar effects as any of the above corresponding method embodiments.

Those skilled in the art will also appreciate that various exemplary logic blocks, modules, circuits and algorithm steps described in combination with the disclosure herein may be implemented as electronic hardware, computer software, or a combination of the two. To clearly illustrate this interchangeability of hardware and software, a general description has been given on functions of various exemplary components, blocks, modules, circuits and steps. Whether this function is implemented as software or hardware depends on specific applications and design constraints imposed on the overall system. Those skilled in the art may implement various functions for each particular application, but such implementation decisions should not be interpreted as leading to a departure from the scope of the disclosure of the embodiments of the present application.

The above are exemplary embodiments disclosed in the present application, but it should be noted that various changes and modifications may be made without departing from the scope disclosed in the embodiments of the present application as defined by the claims. The functions, steps and/or actions according to the method claims of the disclosed embodiments described herein do not need to be performed in any particular order. Furthermore, although the elements disclosed in the embodiments of the present application may be described or claimed in individual forms, such elements may be understood as multiple unless expressly limited to the singular.

It should be understood that, the singular form "a/an" used herein is also intended to include the plural form unless the context clearly supports exceptions. It should also be understood that "and/or" as used herein means any and all possible combinations including one or more associated listed items.

The serial numbers of the disclosed embodiments of the present application are merely for the purpose of description, and do not represent advantages and disadvantages of the embodiments.

Those skilled in the art will appreciate that all or part of the steps for implementing the above embodiments may be performed by hardware, or may also be performed by programs instructing related hardware, the programs may be stored in a computer-readable storage medium, and the storage medium mentioned above may be a read-only memory, a disk or an optical disk, etc.

Those skilled in the art should understand that the discussion of any of the above embodiments is exemplary only, and is not intended to imply that the scope disclosed in the embodiments of the present application (including the claims) is limited to these examples; under the concept of the embodiments of the present application, technical features of the above embodiments or different embodiments may also be combined, and there are many other variations of different aspects of the embodiments of the present application mentioned above, and such variations are not provided in details for brevity. Therefore, any omission, modifications, equivalent substitutions and improvements made within the spirit and principles of the embodiments of the present application shall all fall within the protection scope of the embodiments of the present application.

The invention claimed is:

1. A system for optimizing AHB bus data transmission performance, comprising:
a master;
a decoder connected to the master;
a first multiplexer connected to the decoder; and
a plurality of slaves connected to the first multiplexer, the decoder and the master;
wherein the decoder is configured to output a slave selection signal, and determine a slave in transmission communication with the master based on the slave selection signal; and
the first multiplexer is configured to receive a transmission complete signal output by each slave, and select a transmission complete signal of a corresponding slave based on a first selection signal and output it to the corresponding slave, wherein the first selection signal is formed by beating the slave selection signal.

2. The system according to claim 1, further comprising:
a second multiplexer connected to the decoder; and
a register connected to the second multiplexer and the first multiplexer;
wherein the second multiplexer is configured to select a corresponding slave selection signal based on a second selection signal, beat the corresponding slave selection signal through the register and send the corresponding slave selection signal after beat to the first multiplexer through the register.

3. The system according to claim 2, wherein the decoder is configured to acquire number of cycles of delay of the transmission complete signal output by the slave, and determine number of beats of the slave selection signal based on the number of cycles of delay of the transmission complete signal.

4. The system according to claim 3, wherein the register is configured to acquire the number of beats of the slave selection signal to beat the slave selection signal, and send the slave selection signal after beat to the first multiplexer.

5. The system according to claim 4, wherein the decoder is configured to determine that the number of beats of the slave selection signal is 1 in response to the transmission complete signal is not delayed.

6. The system according to claim 1, wherein the decoder is configured to determine that the number of beats of the slave selection signal is a sum of the number of cycles of delay and 1 in response to the transmission complete signal is delayed.

7. The system according to claim 1, wherein the first multiplexer is configured to take the transmission complete signal output by each slave as respective transmission complete input signal and output which to the slave; and the slave is configured to determine whether an address signal and a control signal output by the master are adopted according to the transmission complete input signal.

8. The system according to claim 7, wherein the slave is configured to receive the address signal and the control signal sent by the master in response to the transmission complete input signal is a high-level signal.

9. The system according to claim 1, wherein the first selection signal is configured to align the slave selection signal with the transmission complete signal output by the corresponding slave.

10. A method for optimizing AHB bus data transmission performance, wherein the following steps are performed based on the system mentioned in claim 1:

outputting the slave selection signal based on the decoder to determine the slave in communication with the master; and receiving the transmission complete signal output by each slave based on the first multiplexer, and selecting, by the first multiplexer, a transmission complete signal of a corresponding slave based on the first selection signal and outputting it to the corresponding slave, wherein the first selection signal is formed by beating the slave selection signal.

11. A server, comprising the system of claim 1.

12. The system according to claim 1, wherein the slave selection signal is decoded by the decoder through the sent address.

13. The system according to claim 7, wherein in response to the input transmission complete signal is low-level, the slave is configured to prolong the time for receiving the address signal and the control signal sent by the master.

14. The system according to claim 1, wherein in response to the master is switched to be in communication with a first slave from being in communication with a second slave, the number of beats of the slave selection signal is the number of cycles of delay plus 1.

15. The method according to claim 10, further comprising:

the second multiplexer is configured to select a corresponding slave selection signal based on a second selection signal, and beat the corresponding slave selection signal through the register and send the corresponding slave selection signal after beat to the first multiplexer through the register.

16. The method according to claim 15, wherein the decoder is configured to acquire number of cycles of delay of the transmission complete signal output by the slave, and determine number of beats of the slave selection signal based on the number of cycles of delay of the transmission complete signal.

17. The method according to claim 16, wherein the register is configured to acquire the number of beats of the slave selection signal to beat the slave selection signal, and send the slave selection signal after beat to the first multiplexer.

18. The method according to claim 10, wherein the first multiplexer is configured to take the transmission complete signal output by each slave as respective transmission complete input signal and output which to the slave; and the slave is configured to determine whether an address signal and a control signal output by the master are adopted according to the transmission complete input signal.

19. The method according to claim 10, wherein the first selection signal is configured to align the slave selection signal with the transmission complete signal output by the corresponding slave.

20. The server according to claim 11, further comprising:
a second multiplexer connected to the decoder; and
a register connected to the second multiplexer and the first multiplexer;
wherein the second multiplexer is configured to select a corresponding slave selection signal based on a second selection signal, beat the corresponding slave selection signal through the register and send the corresponding slave selection signal after beat to the first multiplexer through the register.

* * * * *